US005571358A

United States Patent [19]

Napier et al.

[11] Patent Number: 5,571,358

[45] Date of Patent: Nov. 5, 1996

[54] MULTIPLE-PLY LABEL AND METHOD FOR PRODUCING A MULTIPLE-PLY LABEL

[75] Inventors: William F. Napier, Shoreview, Minn.; Gerald T. Szymczak, Schaumburg, Ill.

[73] Assignee: The Wessel Company, Inc., Elk Grove Village, Ill.

[21] Appl. No.: 134,390

[22] Filed: Oct. 12, 1993

Related U.S. Application Data

[63] Continuation-in-part of Ser. No. 96,707, Jul. 23, 1993, abandoned.

[51] Int. Cl.$^6$ .......... B32B 31/14

[52] U.S. Cl. .......... 156/227; 156/248; 156/257; 156/277; 156/306.3

[58] Field of Search .......... 156/227, 248, 156/257, 268, 250, 277, 305, 306.3; 248/195

[56] References Cited

U.S. PATENT DOCUMENTS

| | | | |
|---|---|---|---|
| 1,273,105 | 7/1918 | Van Dyke . | |
| 1,949,903 | 3/1934 | Fales . | |
| 2,783,172 | 2/1957 | Avery . | |
| 3,252,234 | 5/1966 | Goodman . | |
| 3,420,364 | 1/1969 | Kennedy, Jr. . | |
| 3,466,218 | 9/1969 | Avery . | |
| 3,524,782 | 8/1970 | Buske . | |
| 3,635,746 | 1/1972 | Karlan . | |
| 3,808,718 | 5/1974 | Christiansen . | |
| 3,835,564 | 9/1974 | Gottschalk . | |
| 4,060,168 | 11/1977 | Romagnoli . | |
| 4,188,250 | 2/1980 | Grass . | |
| 4,188,251 | 2/1980 | Grass . | |
| 4,246,058 | 1/1981 | Reed . | |
| 4,281,762 | 8/1981 | Hattemer . | |
| 4,359,358 | 11/1982 | Hattemer . | |
| 4,398,985 | 8/1983 | Eagon . | |
| 4,479,838 | 10/1984 | Dunsirn . | |
| 4,526,405 | 7/1985 | Hattemer | 283/81 |
| 4,528,055 | 7/1985 | Hattemer . | |
| 4,551,373 | 11/1985 | Conlon . | |
| 4,592,572 | 6/1986 | Instance | 281/2 |
| 4,747,618 | 5/1988 | Instance | 281/5 |
| 4,849,043 | 7/1989 | Instance | 156/227 |
| 4,910,058 | 3/1990 | Jameson | 428/42 |
| 4,983,438 | 1/1991 | Jameson | 428/42 |
| 5,024,014 | 6/1991 | Swierczak . | |
| 5,207,458 | 5/1993 | Treichel . | |

*Primary Examiner*—Patrick Ryan
*Assistant Examiner*—Merrick Dixon
*Attorney, Agent, or Firm*—Laff, Whitesel, Conte & Saret, Ltd.

[57] ABSTRACT

A multiple-ply article includes a lower ply and an upper ply with printed matter on each of the plies. The plies are adhered together with an adhesive so that they can be separated from each other without damage to either of the plies, and so that printed matter on the lower ply becomes visible when the upper ply is removed. The multiple-ply article may be attached to a container to serve as a label. A method for producing such a multiple-ply article includes the steps of applying printed matter to a web of stock material, applying adhesive to the web, manipulating the web to form multiple plies, releasably adhering the multiple plies together, and cutting the multiple plies to form the multiple-ply article. The method thus produces in a single process a multiple-ply article which may serve both as a primary label for a product and as a promotion or additional information carrier.

2 Claims, 6 Drawing Sheets

MULTIPLE-PLY LABEL AND METHOD FOR PRODUCING A MULTIPLE-PLY LABEL

This application is a continuation-in-part of application Ser. No. 08/096,707 filed on behalf of William F. Napier on Jul. 23, 1993, now abandoned, for a Multi-Layer, Tear-Away, Wrap-Around Label for Container and Related Method.

FIELD

This invention relates to a multiple-ply label and a method for producing such a label.

BACKGROUND

The process for manufacturing labels for products is generally accomplished separately from the manufacture of any coupon or promotion for such a product. In addition, once the coupon or promotion is manufactured in such a separate process, it must be affixed to the product in yet another operation separate from that of applying the product label to the product.

The application of coupons or promotions to the labels of cylindrical containers is particularly cumbersome in that rotational alignment steps are required during application of the coupon to assure that the coupon is applied at the desired location on the label rather than covering important product trademarks or other information on the label.

The additional manufacturing steps necessary to apply coupons directly to containers add time, labor, and costs to the process of attaching coupons or other removable promotions to a product label. The need therefore exists in the art for a product label which can be provided with a removable promotion or coupon as part of the same manufacturing process which produces the product label. The further need exists in the art to be able to attach such a product label (which includes a coupon) to a product container without needing to apply the coupon to the container in a separate process.

In addition, the dimensions of product containers limit both the size of the label which can be applied to the container and the corresponding label space available for the promotion or description of the product. Furthermore, FDA regulations require product labels to list an increasing amount of nutritional and product information, and thereby further reduce the space on the product label for other uses, such as in-store redeemable coupons, sweepstakes, recipes, or other useful consumer information. The need therefore exists in the art for increased space on product lapels for consumer information, product promotion or other descriptive text and/or graphics.

There is no method or structure known in the art to address these needs. For example, the multiple-layer or laminated structures of Dunsim U.S. Pat. No. 4,479,838 or Eagon U.S. Pat No. 4,398,985 cannot be produced in the same process used in producing the product label itself. Nor can these structures be applied to containers simultaneously with the "primary" or product labels for the containers. The label structure of Hattemer U.S. Pat. No. 4,526,405 cannot meet the need of a simultaneously manufactured product label and coupon structure because, among other things, it requires a barrier sheet in order to be effective.

Accordingly, it is an object of the present invention to overcome the shortcomings and failings of the prior art by providing a multiple-ply label which, when affixed to a product container, serves the function of a product label and also includes a removable portion or ply which can be imprinted with additional information, graphics, or promotional material.

Another object of the present invention is to provide a method for producing a multiple-ply label which includes a removable portion or ply in a single, in-line manufacturing process, thereby saving time, labor and costs.

An advantage of the present invention is that the resulting multiple-ply label, including the removable portion or ply imprinted with additional information, such as a coupon or promotion, can be applied to the associated container together. Such combined application of the "primary" product label and a coupon, promotion, or other information eliminates the additional processes and steps needed in the art today to affix a coupon or other promotion to a product label or container. The elimination of these additional steps offers the advantage of saving capital equipment costs, time and labor.

The present invention also offers the advantage of additional label space for promotions, recipes, consumer information, or any other appropriate uses.

SUMMARY

In one embodiment of the invention, a multiple-ply label includes an upper ply which is imprinted on one or both sides and which is adhered by an adhesive to a lower ply. The upper ply is manually releasable from the lower ply. The lower ply has printing on its upper surface, some of which printing is the same as the printing on the upper ply. The printing on the lower ply is visible when the upper ply is separated from the lower ply. The upper ply may be perforated or otherwise die-cut to facilitate its removal from the lower ply. Such upper and lower plies of the multiple-ply label can be imprinted so that the multiple-ply label includes not only the "primary" product label for the container but also a removable coupon, promotion piece, or other information carrier.

The process of manufacturing such multiple-ply labels includes the steps of imprinting a web of paper or other stock with appropriate textual and/or graphical elements, coating portions of the web with the adhesive, manipulating and/or folding the web so that the adhesive-covered portions of the web contact and adhere to other portions of the web and thereby form multiple-ply structures, and cutting the folded, multiple-ply structures to the appropriate size to produce multiple-ply labels or promotional pieces.

The arrangement of printed elements on the web, the selective application of adhesive to the web, and the manipulation of the web during processing allows the multiple-ply labels to be formed in one manufacturing process, and yet the labels thus formed include a portion which serves as the "primary" product label and a portion adapted to be a removable coupon, promotion, or other information carrier.

The multiple-ply labels, including the removable portion or ply imprinted with additional information, such as a coupon or promotion, can be applied to their associated containers by the label applicators currently used to apply the basic labels prevalent in the art today.

These and other features and advantages of the invention will be more fully understood in reference to the following drawings:

DETAILED DESCRIPTION

Figure 1:
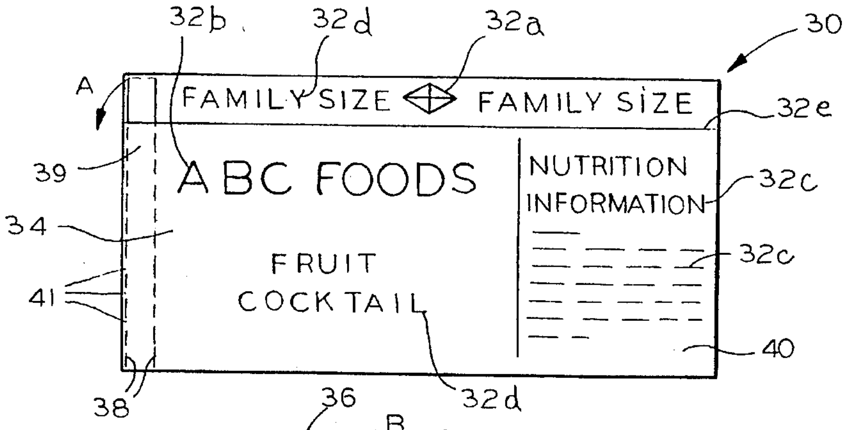
FIG. 1 is a top view of a multiple-ply label of this invention.
Figure 2A:
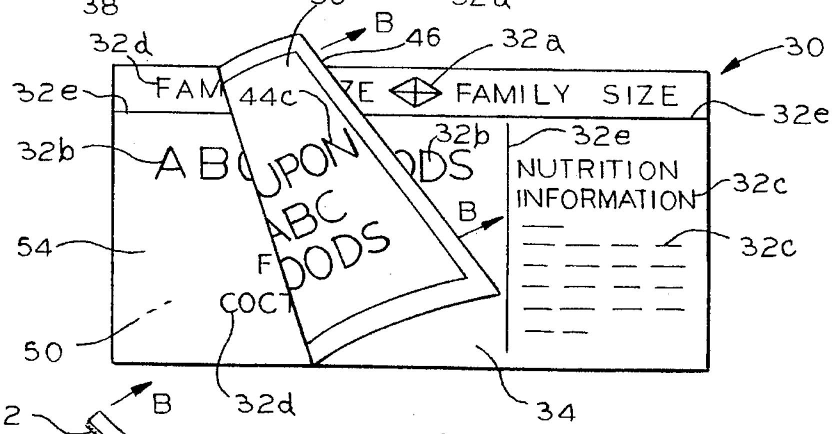
FIG. 2*a* is a top view of the embodiment of FIG. 1 with the upper ply partially removed from the lower ply.
Figure 2B:
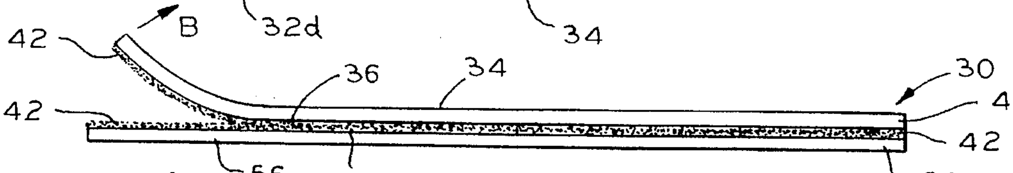
FIG. 2*b* is a side view of the embodiment shown in FIG. 2*a;*
Figure 2C:
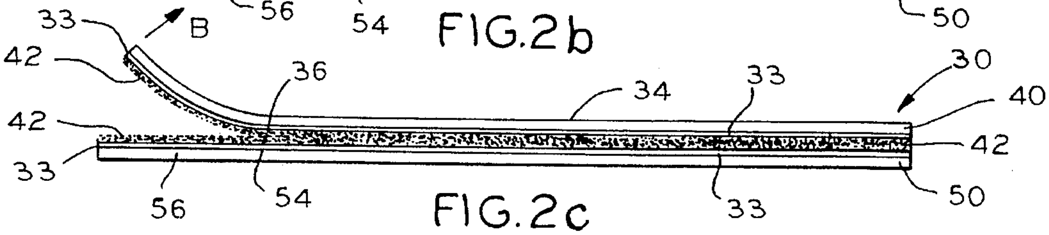
FIG. 2*c* is a side view of an alternate embodiment to that of FIG. 2*a;*
Figure 3:
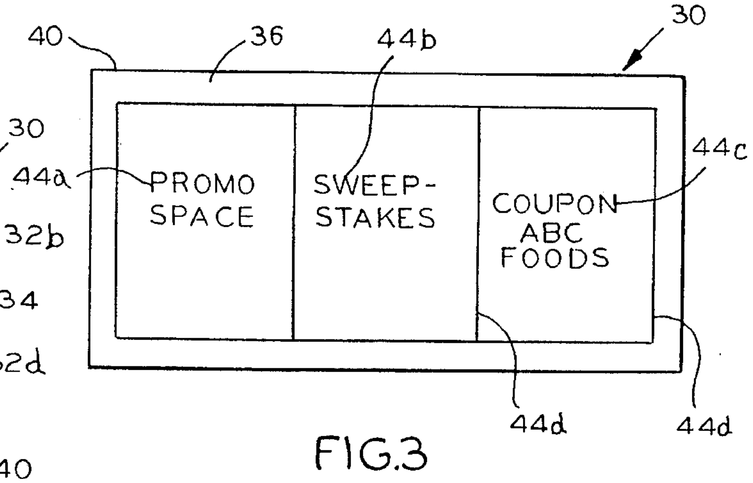
FIG. 3 is a bottom view of the upper ply of FIGS. 2*a* and *b* once it has been fully removed from the lower ply.
Figure 4:
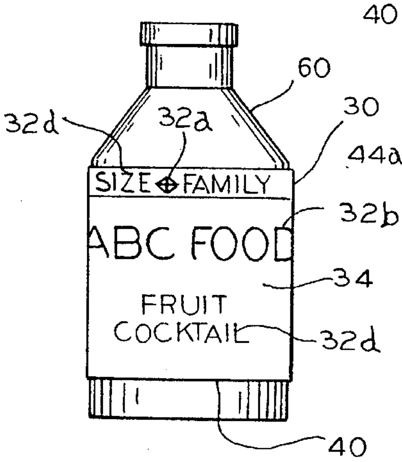
FIG. 4 is a front view of a product container with the multiple-ply label of FIG. 1 affixed thereto.

Referring now to the drawings, FIGS. 1–4 show a preferred embodiment of the present invention. A multiple-ply label 30 (FIGS. 1, 2*a*and *b*) includes an upper ply 40 and a lower ply 50. The upper ply 40 has a top surface 34 which carries printed matter 32*a–e* and a bottom surface 36 which carries additional printed matter 44*a–d* as best seen in FIG. 3. Referring now to FIGS. 2*a*and *b*, the lower ply 50 has a top surface 54 which has been imprinted with the same printed matter 32*a–e* as on the top surface 34 of the upper ply 40. The lower ply 50 also has a bottom surface 56 which is adhered to a container 60 (FIG. 4).

The upper ply 40 and the lower ply 50 are adhered together by an adhesive 42 (FIG. 2*b*). In use, the two plies 40 and 50 can be manually separated from each other in the direction indicated by arrow B without affecting the structural integrity of either the upper ply 40 or the lower ply 50 and without causing the lower ply 50 to separate from the container 60 (FIG. 4).

Figures 6A, 6B, 6C:
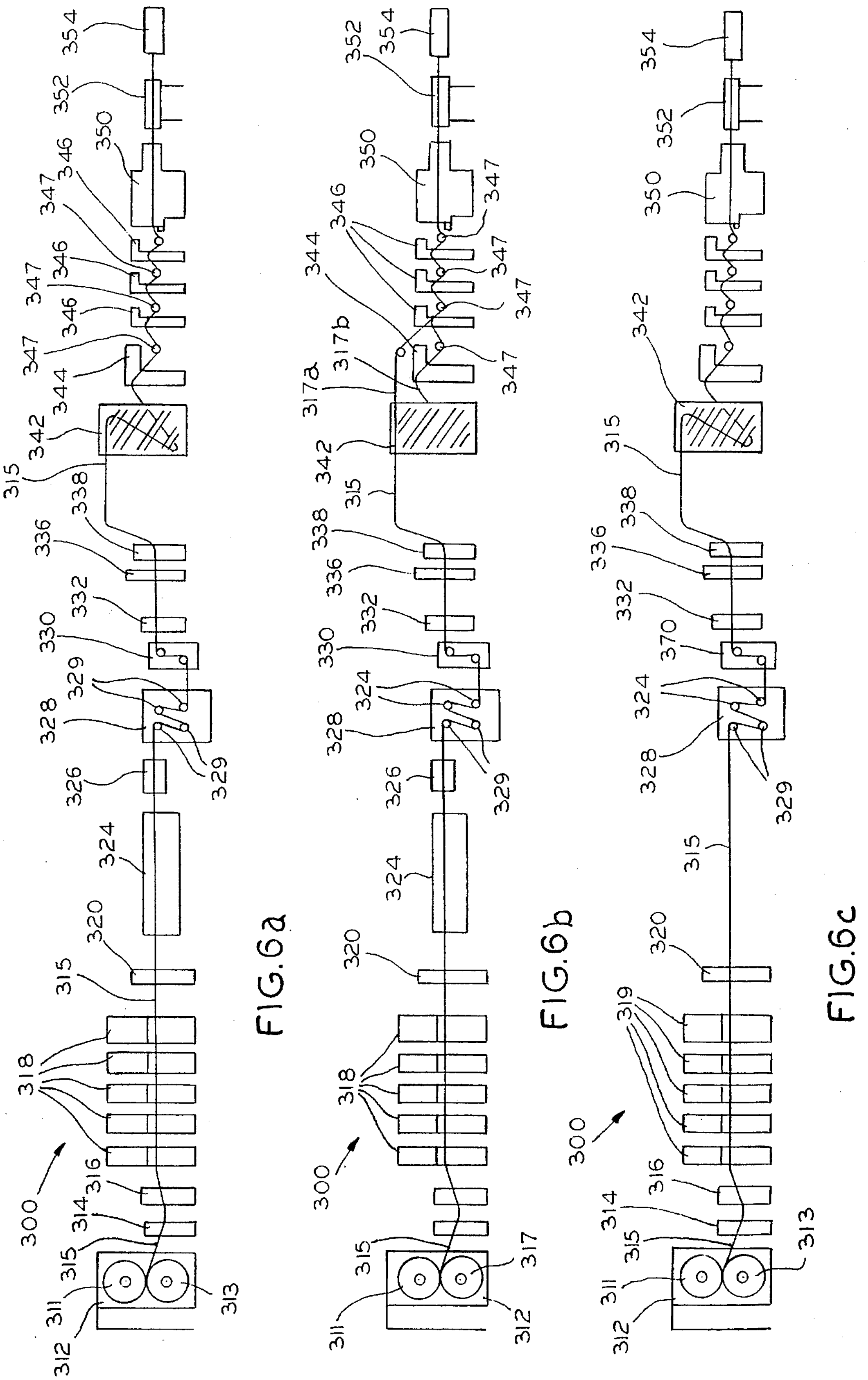
FIG. 6*a* is a schematic view showing the process for manufacturing multiple-ply labels according to the present invention.
FIG. 6*b* is a schematic view showing a second embodiment of the process of the invention.
FIG. 6*c* is a schematic view showing a third embodiment of the present invention.

A single, in-line process 300 for creating the label 30 is shown schematically in FIGS. 6*a–e*. The process 300, discussed in more detail subsequently, allows both the upper ply 40 and the lower ply 50 to be imprinted, formed, and adhered together from a single web of stock 35 (FIG. 6*a*).

Referring once again to FIGS. 1–4, the upper ply 40 and the lower ply 50 are preferably made of 45 to 80 lb paper, although the type and weight of the stock may be varied to suit the label requirements of any given application. The printed matter 32*a–e* is preferably imprinted using an offset process on the top surface 34 of the upper ply 40 and the top surface 54 of the lower ply 50. The printed matter 32*a–e* may include such indicia as a trademark 32*a*, a trade name 32*b*, nutritional text 32*c*, descriptive terms 32*d*, and graphical or color elements 32*e*.

The bottom surface 36 of the upper ply 40 is imprinted with additional printed matter 44*a–d*, preferably using an offset process. The additional printed matter 44*a–d* may include a promotional text 44*a*, a sweepstakes 44*b*, a coupon 44*c*, and graphical elements 44*d*.

The arrangement of printed matter 32*a–e* on the top surfaces 34 and 54 and the arrangement of the additional printed matter 44*a–d* on the bottom surface 36 allows the label 30, when affixed to the container 60 (FIG. 4), to, at the same time, serve as a "primary" product label and a removable promotion, coupon, or other information carrier.

The printed matter 32*a–e* and the additional printed matter 44*a–d* are only representative and can be any combination or arrangement of text, statistics, symbols, or graphical elements desired for a given product label, subject only to any limitations of the printing process used. In addition, while the printed matter 32*a–e* and the additional printed matter 44*a–d* have been imprinted on the upper ply 40 and the lower ply 50 using an offset printing process, alternate printing processes, such as rotogravure or flexography, can also be used.

The adhesive 42 used to removably adhere the upper ply 40 and the lower ply 50 to each other is such that it has a peel tensile strength less than the tensile strength of the stock of the label 30 to which it has been applied. In this way, when separated from each other, the plies 40 and 50 do not tear. Another property of the adhesive 42, its "tack" must be sufficient to resist unintended separation of the plies 40 and 50 while also allowing for the intended, manual separation. An adhesive comprising an acrylic synthetic resin formed from an aqueous solution of approximately 41% solids by weight having a tack ranging from 40 to 150 gms. per inch and a Polyken probe tack of less than 400 gms. has been found suitable for most stock materials, with particular values depending on the particular stock being used. Adhesives in this range of tack are termed "fugitive adhesives" in the industry.

The adhesive 42 adheres the upper ply 40 and the lower ply 50 to each other by being applied to either one of the opposing surfaces 36 and 54 of the multiple-ply label 30 (FIGS. 2*a*and 2*b*). The resultant adhesion between the upper ply 40 and the lower ply 50 is such that the upper ply 40 can be manually peeled away from the lower ply 50 without affecting the structural integrity of either the ply 40 or the ply 50.

The adhesive 42 has been applied at a thickness of 0.003 inches (3 mils) thereby making it substantially transparent and allowing for the additional printed matter 44*a–d* on the bottom surface 36 (FIG. 3) to be easily read and understood through any residue of adhesive 42 remaining on the bottom surface 36.

The adhesive 42 has the additional property of being substantially non-tacky, so that the upper ply 40, once separated, can be handled and stored by a consumer like any other slip of paper.

The range of adhesives 42 suitable for removably and nondestructively adhering the plies 40 and 50 together can be increased by the addition of a barrier coating 33, as shown in FIG. 2*c*, to the top surface 54 of the lower ply 50 and the bottom surface 36 of the upper ply 40. The barrier coating 33 aids in preventing the peel tensile strength and the tack of the adhesive 42 from affecting the structural integrity of the underlying plies 40 and 50. Accordingly, when the barrier coating is used, the adhesive 42 suitable for removably adhering the plies 40 and 50 to each other need not be limited to those categorized in the art as "fugitive," meaning the adhesive 42 can have a Polyken probe tack of greater than 400 gms. without affecting the structural integrity of the plies 40 or 50.

The barrier coating 33 also acts to inhibit the unintended transfer or "bleeding" of ink, a phenomenon known as "offsetting," between the top surface 54 of the lower ply 50 (FIG. 2*a*) and the bottom surface 36 of the upper ply 40 when these two surfaces are adhered to each other by the adhesive 42. The barrier coating 33 further acts to enhance the transparency of the adhesive 42 by facilitating uniform application of the adhesive 42 as described below.

The barrier coating 33 can be any of the commercially available and suitable silicone release coatings known in the art, such as Dow Corning's Syl-Off® 7676 Release Coating, applied to the plies 40 and 50 in an amount which can range from 0.4 to 2.0 lbs per ream (3000 sq. ft) and cured either thermally or by radiation (UV).

Although specific ranges and properties for the fugitive glue 42 and the optional barrier coating 33 have been described for this embodiment, these ranges may be varied depending on the demands of the particular label so long as the plies 40 and 50 are removable without being torn or otherwise rendered illegible by "offsetting."

The process of peeling away the upper ply 40 is made easier by a zip strip 39 (FIG. 1) in the upper ply 40 which is formed during the manufacturing process 300 (described subsequently) by perforating or die-cutting transversely across the upper ply 40 in two, parallel perforation lines 38. In use, the zip strip 39 is peeled away in the direction indicated by arrow A along the perforation lines 38 to leave an easily grasped edge 46 (FIG. 2*a*), which is manually pulled away from the lower ply 50.

As seen in FIG. 1, the perforation lines 38 of the label 30 include uncut portions 41. These uncut portions 41 allow the upper ply 40 of the label 30 to remain substantially uniform until such time as it may be manually separated from the lower ply 50 along the boundaries formed by the perforation lines 38.

The bottom surface 56 of the lower ply 50 is adapted to be adhered to the container 60 with commercially available glues having greater adhesive strength than the adhesive 42. Thus the lower ply 50 is not separated from the container 60 when the upper ply 40 is pulled away from the lower ply 50.

Alternately, the bottom surface 56 need not be adhered to a container, thereby allowing the multiple-ply label 30 to serve as a circular, flyer, or pamphlet unassociated with any container or product.

Even after the removal of the upper ply 40, the printed matter 32*a–e* remains with the container 60 since it appears on the upper surface 54 of the lower ply 50 attached to the container 60. Thus, the label 30, when affixed to the container 60 (FIG. 4) at the same time can serve as both a "primary" product label and a removable promotion, coupon, or other information carrier.

It will be appreciated by those skilled in the art that while the above invention has been demonstrated for the label 30 having two plies, an upper ply 40 and a lower ply 50, it is equally applicable to multiple-ply labels of greater than two plies.

Figure 5A:
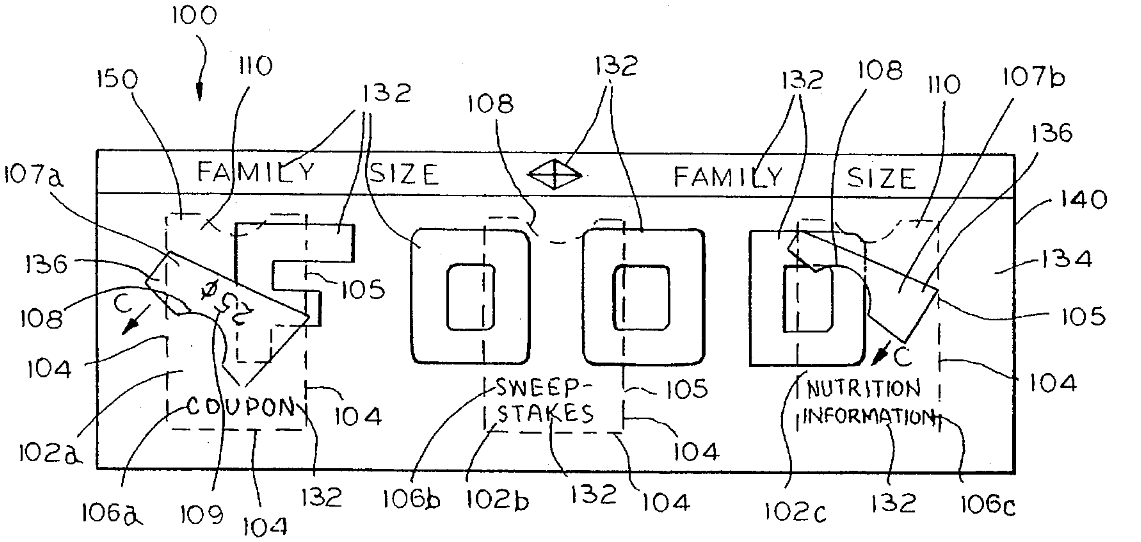
FIG. 5*a* is a top view of an alternate embodiment of the multiple-ply label of the present invention.

In addition, while the invention allows the upper ply 40 to be peeled away in its entirety, it may be desirable to have only selected portions of a label capable of removal. Such an alternative embodiment is shown in FIGS. 5*a* and *b*. A multiple-ply label 100 includes an upper ply 140 and a lower ply 150 adhered together and mountable on a product container as in the previous embodiment. Rather than having the entire upper ply 140 removable, however, sections 102*a–c* of the upper ply 140 have been die cut or perforated during the manufacturing process (described subsequently) along perforation lines 104.

The upper ply 140 has a bottom surface 136 and a top surface 134. The top surface 134 carries printed matter 132. The printed matter 132 may include promotional information 106*a–c* in sections 102*a–c* of the upper ply 140, such as a redeemable coupon 106*a*, a sweepstake entry form 106*b*, and other consumer information of interest, such as nutrition information 106*c*.

Figure 5B:
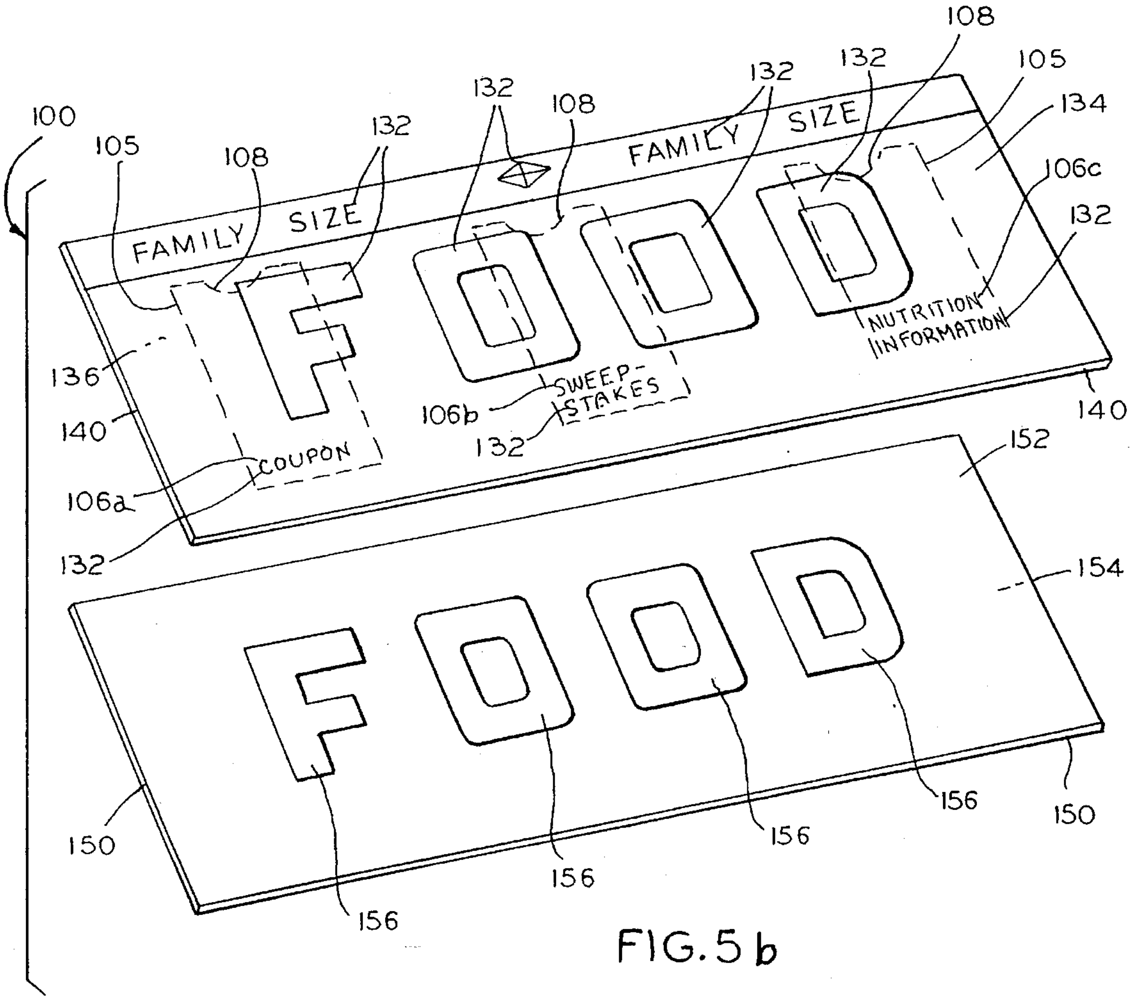
FIG. 5*b* is an exploded perspective view of the embodiment of FIG. 5*a;*

The lower ply 150 (FIG. 5*b*) has a top surface 152 and a bottom surface 154. The top surface 152 carries printed matter 156 and includes surface portions 110 (FIG. 5*a*) at locations which correspond to the locations of the sections 102*a–c* of the upper ply 140.

In use, the sections 102*a–c* which contain the promotional information 106*a–c* can be removed from the label 100 by manually peeling the sections 102*a–c* away from the upper ply 140 at tabbed portions 108 preferably in the direction indicated by arrow C. When the sections 102*a–c* are peeled away, the corresponding portions 110 of the lower ply 150 are revealed, which are imprinted with printed matter 156 as it would have appeared on the label 100 absent the printed matter 132.

The arrangement of the printed matter 132 on the top surfaces 132 and 152, as well as the arrangement of the promotional information 106*a–c* on the removable sections 102*a–c*, allows the multiple-ply label 100 to serve as both a "primary" product label and a removable promotion, coupon, or other information carrier. For this embodiment, the bottom surface 136 of the upper ply 140 has not been imprinted with printed matter except for portion 107*a* which is on the bottomside of the section 102*a* and which carries additional printed matter 109. It will be appreciated that printed matter, including product and promotional information, can be carried in any number of ways on the top and bottom surfaces 134 and 136, respectively, of the upper ply 140 and on the top and bottom surfaces 152 and 154, respectively, of the lower ply 150.

Similarly, the size, shape, and arrangement of the peel-away sections 102*a–c* can be varied to suit any number of product labels or promotions. For example, the section 102*c* has been provided with the perforation 104 on only three sides rather than on four sides as in the sections 102*a* and 102*b*; in this way, the section 102*c* is not entirely removable from the upper ply 140 but rather acts as an attached cover.

As seen in FIGS. 5*a* and *b*, the perforation lines 104 of the label 100 include uncut portions 105. These uncut portions 105 allow the upper ply 140 to remain substantially uniform until such time as they may be manually separated from the lower ply 150 along the boundaries formed by the perforation lines 104.

FIG. 6*a* schematically shows the process 300 for manufacturing of multiply-ply labels according to the present invention. A roll stand 312, such as that manufactured by Butler Corporation, Model B27ED, holds a first roll of stock material 313, from which a web 315 is drawn and which undergoes the processing steps discussed subsequently to create multiple-ply labels. The stock material of the roll 313 is generally paper stock, and the weight, type and width vary to suit the particular label to be manufactured.

A second additional paper roll 311 is spliced to the web 315 by processes well-known in the art when the first roll 313 has been depleted, thereby enabling the web 315 to be continually processed to create any pre-determined number of multiple-ply labels.

The web 315 travels through an edge-guide station 314, such as that manufactured by Quad Tech (Series 2000). The edge guide station 314 keeps the web 315 from shifting laterally as it travels. A constant-tension, in-feed, tilt-box station 316, such as that manufactured by Butler Corporation, Model 412S-27, moves the web 315 through the subsequent processing steps at a constant speed, tension and angular orientation.

The web 315 then travels through one or more offset printing presses 318, such as those manufactured by Hantscho (Mark V-A), which apply colored ink by way of graphic plates to the web 315, according to processes well known in the industry, so as to print the various graphical and textual element of the label. The number of printing presses 318 required to print a given label increases as the number of different colors on that label increases.

Figure 7:
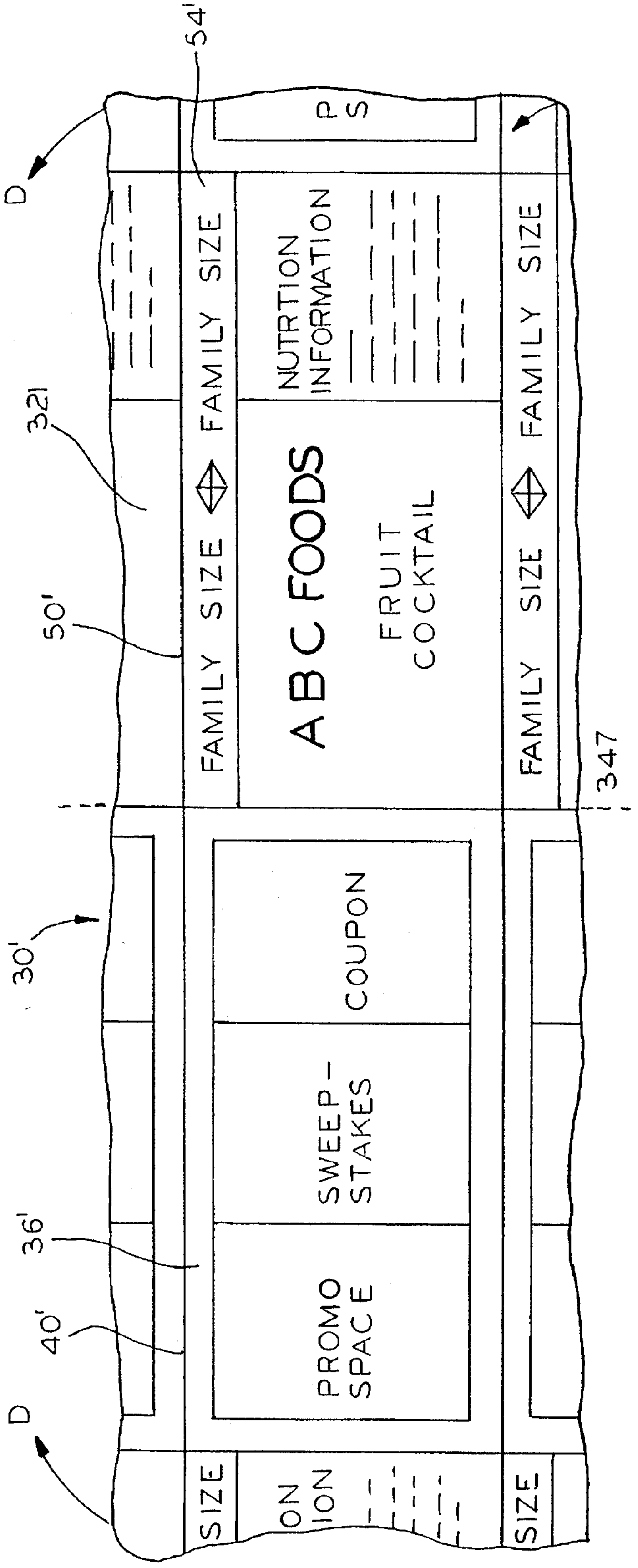
FIG. 7 is an enlarged, top view of a portion of a web used in processes depicted in FIGS. 6*a–e;*
Figure 8:
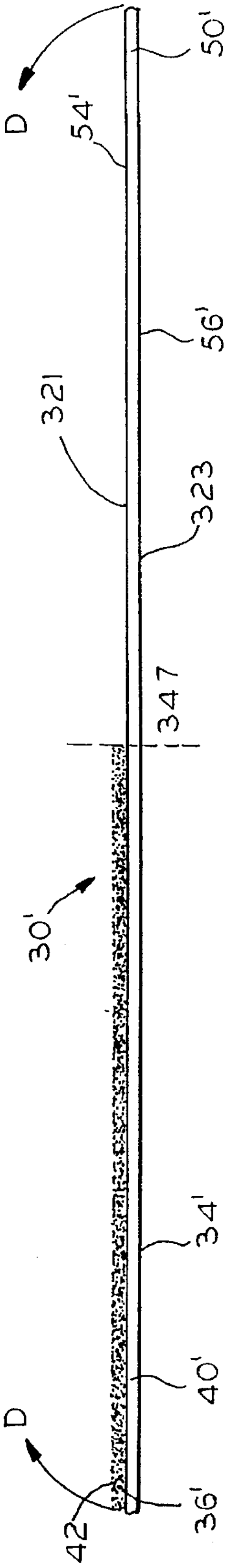
FIG. 8 is a side view of the web portion shown in FIG. 7.
Figure 9:
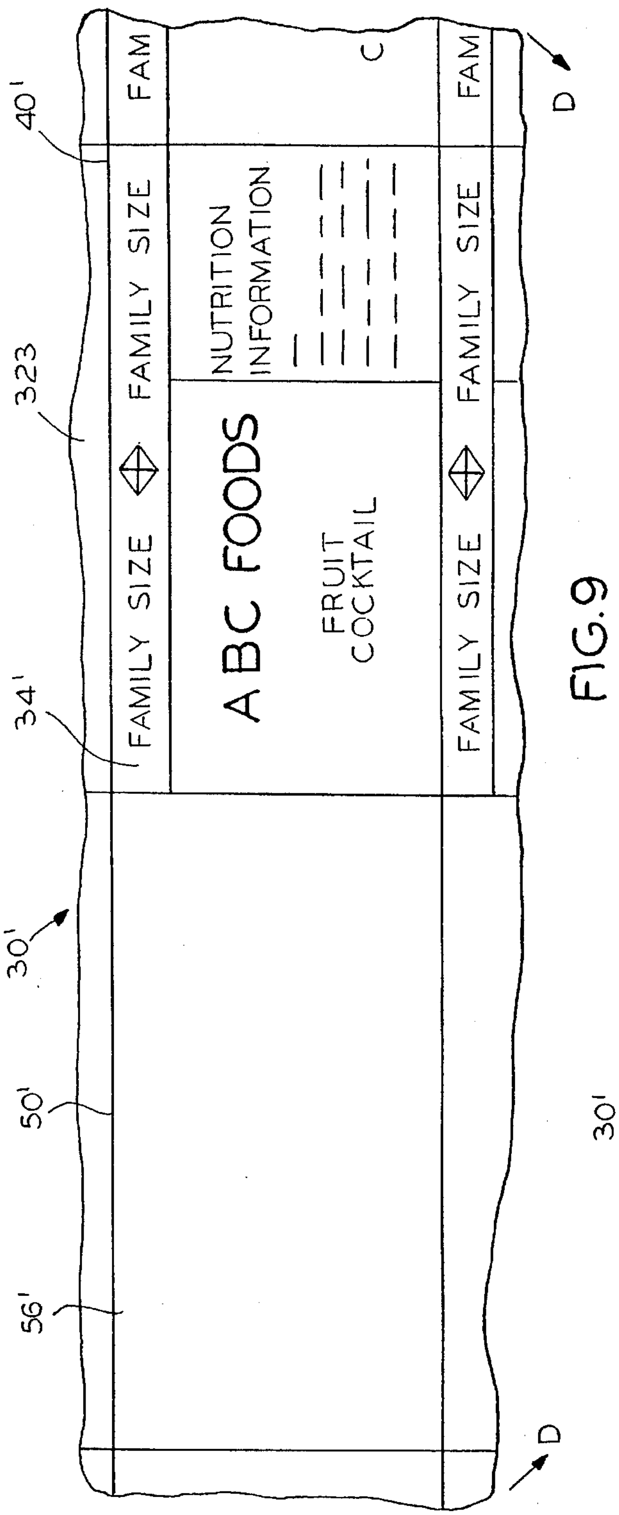
FIG. 9 is a bottom view of the web portion shown in FIG. 7.

The label 30 described earlier with reference to FIG. 1 is shown in FIGS. 7–9 in its unfinished state while still part of the web 315 but after emerging from the printing presses 318. As seen in FIGS. 7–9, the web 315 can be imprinted by the presses 318 on either an upper web surface 321 (FIG. 7) or a lower web surface 323 (FIG. 9) or on both surfaces 321 and 323 simultaneously. Having been imprinted by printing presses 318, the web 315 travels through an optional gluing station 320 which applies the barrier coating 33 described earlier with reference to FIG. **2*b* in a specific pattern on the top surface 54 of the lower ply 50 and the bottom surface 36 of the upper ply 40. When the barrier coating 33 is not required by a particular label application, such as the label 100 shown in FIG. 5, the gluing station 320 is not necessary to the process 300**.

To dry the ink applied by the printing presses 318 and to remove excess solvent deposited in the printing process, the web 315 passes through a heat-set oven 324 such as that manufactured by TEC Systems (Series 80), Model C-1800, although other types and models of the heat set oven 324 can be substituted. Preferably, an air temperature of approximately 350 degrees Fahrenheit in the heat set oven 324 and a temperature of approximately 290 degrees Fahrenheit of the web 315 are used to produce effective drying, although other temperatures can be used or may be required depending on the physical characteristics of the web 315 being processed.

Having been heated by the heat-set oven 324, the web 315 radiates solvents in vapor form. These solvents are channeled away by the convective action of a smoke tunnel 326 associated with the heat-set oven 324.

The web 315 is further cooled by a series of rollers 329 of a water-cooled, chiller roller stand 328, such as that manufactured by the Hantscho company (No. W745). A temperature of between 35 and 55 degrees Fahrenheit has been found to cool the web 315 effectively for further processing.

The web 315 now travels through a silicone applicator station 330, such as that manufactured by Quad Tech, Inc., in which the web is treated with an anti-static solution, such as silicone. The station 330 also acts to maintain lateral alignment of the web 315 by means of a tilt-box well-known in the industry.

The web 315 at this point has undergone steps of the process 300 involving exposure to solvents and heat and has therefore become undesirably dry. The web 315 is thus passed through a web offset, heat-set, scrubbing system 332, such as that described in pending U.S. patent application Ser. No. 08/000,635, filed Jan. 5, 1993, which adds moisture, removes excess solvents, and further cools the web 315 with an aqueous solution.

Perforations are made in the web 315 by passing it preferably through a perforator unit 336, such as that manufactured by Scheffer Co., or a die-cutting unit 338, such as the rotary die-cutting unit manufactured by WPM Inc. (Ser. No. 11766), so that when processing is completed, the labels 30 and 100 (described earlier with reference to FIGS. **2*a* and 5*a*, respectively) include the perforation lines 104 around the sections 102*a–c* of the label 100 and the perforation lines 38 forming a zip-strip 39 of the label 30**.

In the case of the label 100 embodied in FIGS. **5*a* and *b*, the perforation lines 104 are formed by the die-cutting unit 338 (FIG. 6*a*) by means of a Ryco rotary cutter assembly 371 shown in FIG. 8, which has been equipped with a die plate 372 containing a substantially raised edge 370. In operation, the raised edge 370 is brought into periodic contact with the web 315 at selected locations by synchronization methods known in the industry, thereby forming the perforation lines 104 (FIG. 5**).

Figure 11:
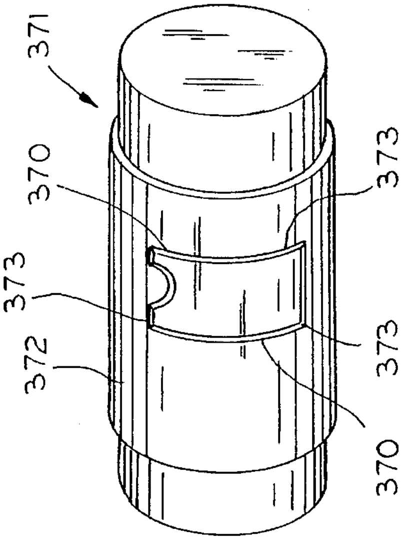
FIG. 11 is a perspective view of a portion of the die-cutting station depicted schematically in FIGS. 6*a–e*.

The uncut portions 105 of the perforation lines 104 are formed by the die-cutter 338 by interrupting the raised edge 370 (FIG. 11) of the die plate 372 with flattened areas 373 which do not cut the web 315 when brought into contact with the web 315 during processing.

It will be appreciated that the raised edge 370 can assume any number of alternative shapes or locations on the die plate 372 so as to cut any number of different patterns in the web 315 at any selected location. For example, the label 30 shown in FIG. 1 has the perforation lines 38 of the zip strip 39 created by the raised edge 370 in an alternate linear configuration.

The perforation lines 38 in the label 30 shown in FIG. 1 and the perforation lines 104 of the label 100 shown in FIG. 5 could alternately have been made using the perforating station 336 instead of the die-cutter 338 (FIGS. **6*a–e*). The perforating station 336 operates to form the perforation lines 38 and 104 in web 315** by methods known in the industry.

It will be appreciated that the perforating station 336 and the die-cutter 338 can be used separately or in combination to make whatever pattern of cuts in the web 315 is required for the particular label to be produced.

The web 315 passes through a ribbon deck station 342, such as that available from the Scheffer Co., which divides, handles, or otherwise manipulates the web 315 as required by the particular label to be produced. In the case of the two-ply labels 30 and 100 (FIGS. 1 and 5, respectively), the web 315 passes over rollers 343 through the station 342 without further manipulation.

The web 315 passes through a pattern gluer 344, such as that by Scheffer Co. or by Coating & Moistening Systems, Inc., at which point the pattern gluer 344 applies the adhesive 42 (described earlier with reference to FIG. **2*b*) to either the upper web surface 321 or the lower web surface 323 (FIGS. 7-*a*) by means of a screen pad known in the art. The adhesive 42 can be applied uniformly over a portion of the web 315, to selected areas of the web 315, or in a non-continuous film on the web 315, in order to adhere portions of the web 315** to each other with sufficient adhesion to form removable, multiple plies as discussed more fully below.

Once the adhesive 42 has been applied, the web 315 passes through rollers 347 and one or more folding stations 346 manufactured by Scheffer Co., where the web 315 is folded or otherwise manipulated, as more fully described below, so that portions of the web 315 overlay other portions of the web 315, thereby forming a multiple-ply structure.

The application of adhesive 42 by the pattern gluer 344 to the web 315 and the manipulation of the web 315 by the folding station 346 to form multiple-ply structures is best understood with reference to FIGS. 7–10, which show a web portion 30' of the web 315 corresponding to the label 30 described earlier with reference to FIGS. 1–4.

The web portion 30' includes further portions corresponding to the label 30 (FIGS. 1–4) as follows: the web portion 30' has an upper-ply portion 40' and a lower-ply portion 50' (FIGS. 7 and 9); the upper-ply portion 40' has a top-surface portion 34' (FIG. 9) and a bottom-surface portion 36' (FIG. 7); the lower-ply portion 50' has a top-surface portion 54' and a bottom-surface portion 56'.

Figure 10:
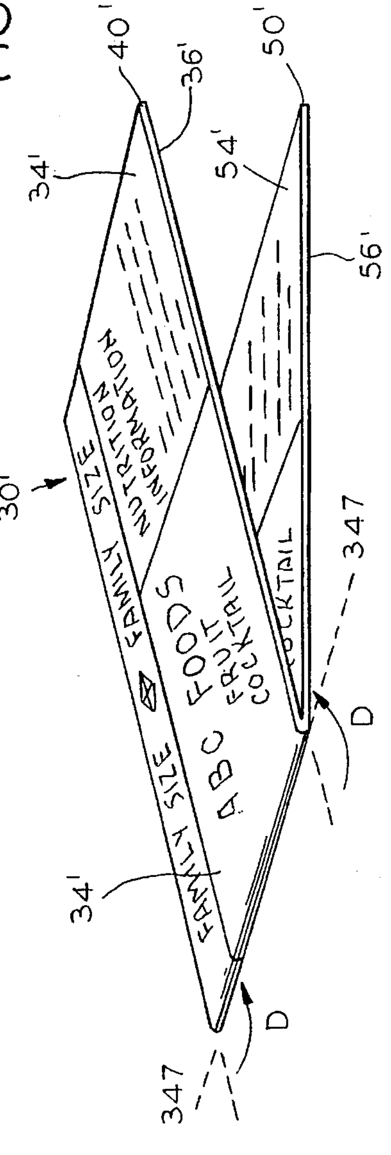
FIG. 10 is a perspective view of the web portion shown in FIG. 7 undergoing the folding operation according to the process of the present invention.

As best seen in FIG. 8, the adhesive has been applied to the bottom-surface portion 36' which will be subsequently manipulated to oppose the top-surface portion 54' as seen in FIG. 10. The adhesive 42 is formulated such that it need only be applied to one of the opposing surfaces 36' or 54' of the web portion 30' to produce an adhered multiply-ply structure. In more general terms, the application of the adhesive 42 to the web 315 by the pattern gluer 344 will vary depending on how the web 315 will be manipulated to create opposing web portions, as well as on the nature of the multiply-ply structure to be formed.

A thickness of 0.003 inches of the adhesive 42 has been applied to the bottom surface 36' of the label 30. Any number of alternate adhesives with varying degrees of adhesion can be substituted for or used in combination with the adhesive 42 to suit a variety of label structures and promotional pieces.

Having applied the adhesive 42 to the bottom surface 36', the web portion 30' is manipulated in the folding station 346 by folding the web portion 30' in the direction indicated by Arrow D along an axis transverse to the web portion 30' at location 347 as been seen in FIG. 10. The folding process brings adhesive 42 on the bottom surface 36' of the web portion 30' into contact with the upper surface 54' of the web portion 30', after which point the adhesive cures, adhering the surfaces 36' and 54' to each other until such time as they may be manually separated.

The above described steps of imprinting selected portions of the web 315, applying adhesive selectively to the web 315, and folding the web 315 creates a multiple-ply structure in a single, in-line process which can serve as both a "primary" product label and a removable coupon, promotion, or other information carrier.

The web 315, bow folded into a multiple-ply structure with removable plies, enters a cutting station 350, such as the Roto-cutter manufactured by WPM Co., where it is cut to the appropriate dimension to produce the labels 30 and 100 shown in FIGS. 1 and 5*a*, respectively. Finished labels exit the cutting station 350 and pass through a commercially available transfer station 352. At the transfer station 352, the labels can be bundled for transfer to label applicators 354, where the labels are applied to bottles, cans or other containers which carry labels.

The multiple-ply labels 30 and 100 produced by the above described process have a structural integrity and flatness so that they are readily affixable to bottles, cans, or other containers by label applicators 354 which are known in the industry. Once applied to containers by the label applicators 354, however, the multiple-ply labels 30 and 100 already include a removable coupon, promotion, or other information carrier without needing further processing.

In a variation 400 to the above-described process, shown in FIG. 6*b*, the web 315 is slit longitudinally by known methods when passing through the station 342 to form two subwebs 317*a* and *b*, each of narrower width than the web 315. In this variation, the subwebs 317*a* and 317*b* pass through the gluing station 344 as required and the subweb 317*a* is remarried to the subweb 317*b* at the folding station 346 to form a multiple-ply structure which is subsequently processed into multiple-ply labels as discussed previously.

In another variation to the process 400, if the subweb 317*a* is itself folded and then remarried to the subweb 317*b* at the station 346, a triple-ply structure can be produced, which is subsequently processable as described for the process 300 into triple-ply labels.

It will be appreciated that the folding and remarrying operations of the station 346, along with the selected application of the adhesive 42 at the station 344, can be varied to produce any number of plies adhered together in a variety of patterns to thereby produce labels of two or more plies for any given application. The multiple-ply labels thus produced can thereby carry a "primary" product label and a removable coupon, promotion, or other information carrier in any number of ways—both of which are affixed at the same time to a container by the label applicator 354.

The above-described process is not limited to the offset printing press(es) 318 (FIGS. 6*a* and *b*). The web 315 in FIG. 6*c* is shown undergoing the same process steps described with reference to FIG. 6*a* and *b*, except that rather than using offset printing presses 318, printing on the web 315 is accomplished by one or more commercially available rotogravure or flexographic presses 319.

In using the rotogravure or flexographic printing presses 319, the separate drying station 324 and the separate smoke tunnel 326 are not required.

Figure 6D:
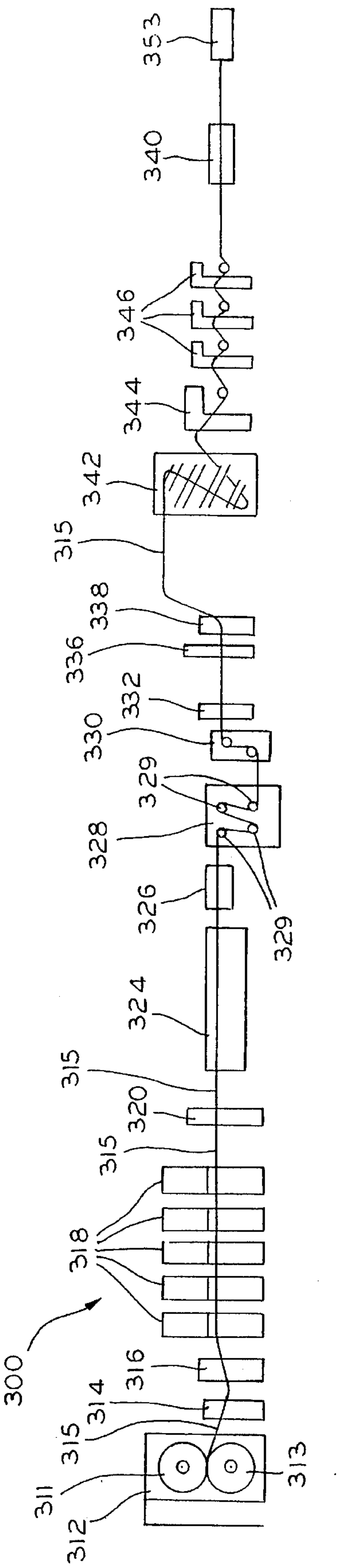
FIG. 6*d* is a schematic view showing a fourth embodiment of the process of the present invention.
Figure 6E:
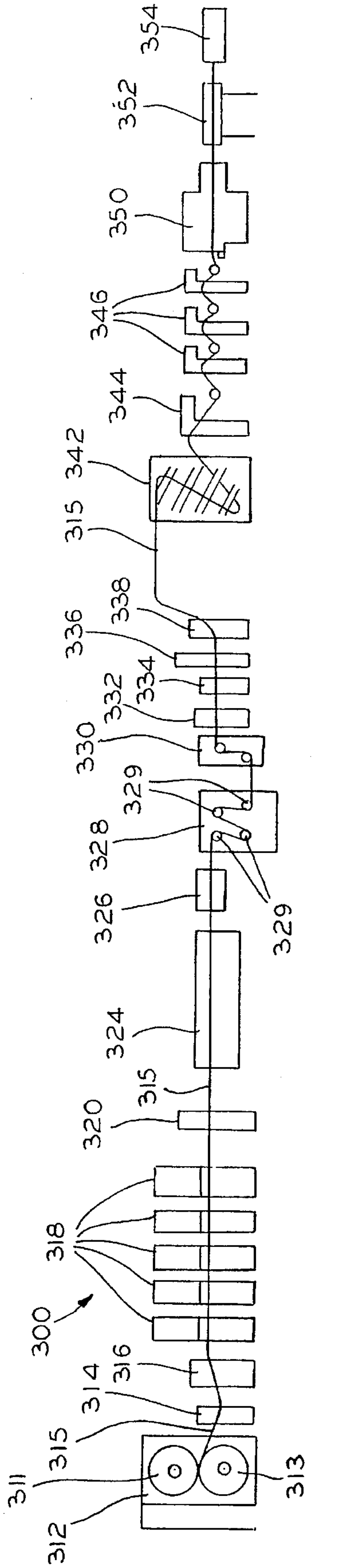
FIG. 6*e* is a schematic view showing a fifth embodiment of the process of the present invention.

In another process variation as shown in FIG. 6*d*, the web 315 can have perforations formed in it by gathering the web 315 into a sheet feeder 340 after completing the processing of the folding station 346. Once the web 315 has been gathered into the sheet feeder 340, it is transferred to a commercially available die-cutting station 353, which, according to operations known in the industry, makes perforations in multiple folds of the web 315, such as perforation lines 38 (FIG. 1) and the perforation line 104 (FIG. 5), in a single movement of the die-cutting station 353.

Finally, the processes shown in FIGS. 6*a–d* can be supplemented with optional processing stations often used in the manufacture of product labels. One such station, the numbering station 334 (FIG. 6*e*) has been added to the process shown in FIG. 6*a* after the web offset scrubbing station 332 and before the perforated station 336. The numbering station 334 adds serial numbers to the labels useful in tracking products, determining sweepstakes winners, etc.

While the present invention has been described with reference to a preferred embodiment thereof, illustrated in the accompanying drawings, various changes and modifications can be made by those skilled in the art without departing from the spirit and scope of the present invention.

What is claimed is:

1. A method for simultaneously affixing a releasable coupon and a product label to a product using a labelling apparatus for single-ply, product labels, comprising the steps of:

a. providing a single web of stock material having two opposing web surfaces;

b. applying printed matter to the single web using a process selected from the group consisting of offset printing and rotogravure, the printed matter being applied to form a product label portion of the single web and a coupon portion of the single web;

c. selectively applying a non-tacky-residue adhesive to the single web to one of the web surfaces;

d. folding the single web over on itself along a transverse axis of the single web to form a top ply and a bottom ply with the label portion positioned on both of the plies and the coupon portion positioned on the top ply;

e. releasably adhering the top ply to the bottom ply with the adhesive to form a two-ply laminate;

f. cutting the two-ply laminate from the folded single web to form a combination releasable coupon and product label;

g. providing a labelling apparatus for single-ply product labels; and h. feeding the combination releasable coupon and product label into the labelling apparatus to adhere the combination releasable coupon and product label to the product in a single labeling operation with the bottom ply being adhered directly to the product and the top ply overlying the bottom ply.

2. The method of claim 1, wherein the step of applying the adhesive includes the step of applying an acrylic synthetic resin in an amount sufficient to have a tack ranging between 40 and 150 grams per inch.

* * * * *